United States Patent Office 3,507,156
Patented Apr. 21, 1970

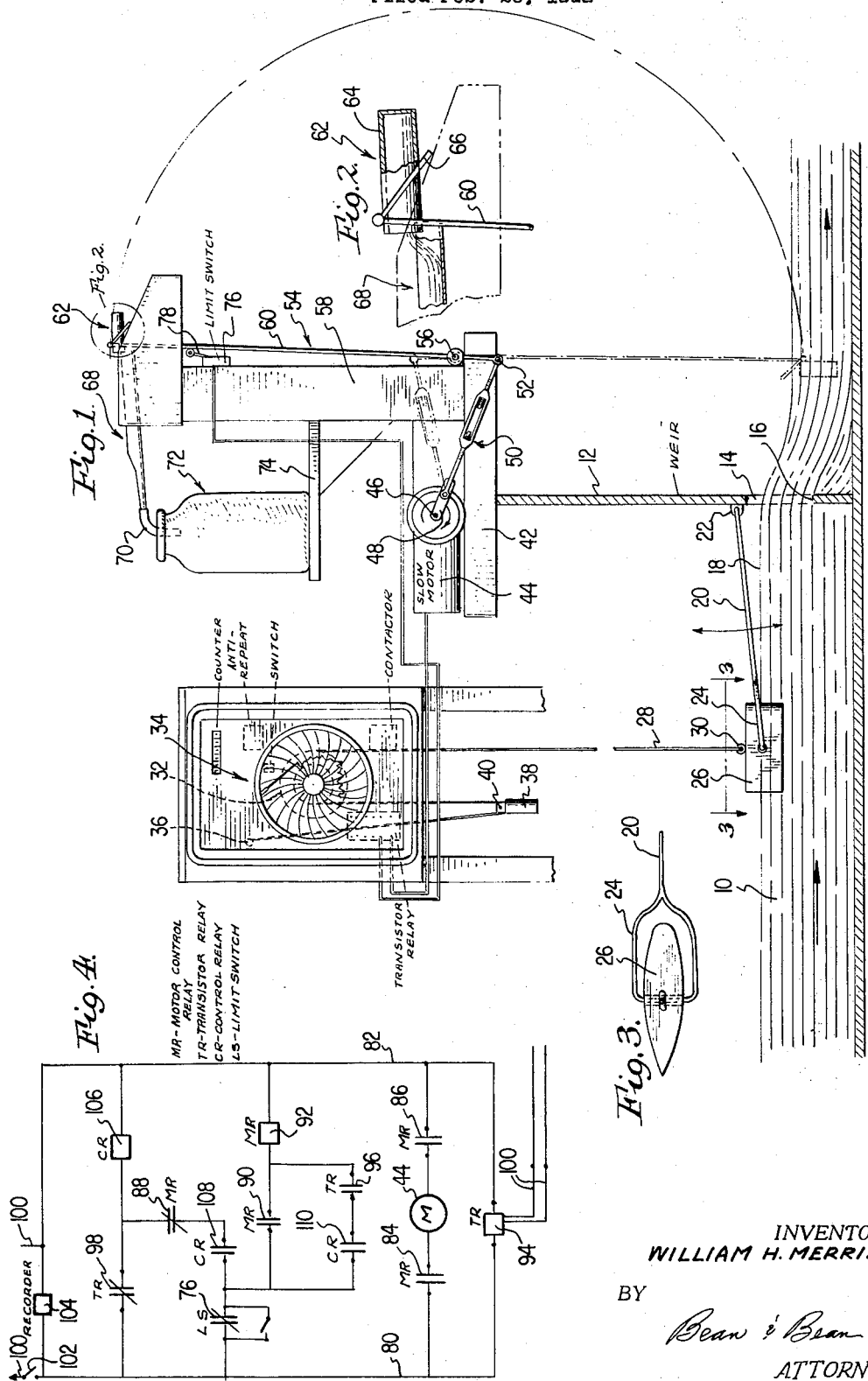

3,507,156
COMPOSITE SAMPLING SYSTEM FOR WASTE WATER DISPOSAL
William H. Merrill, Jr., 80 Huntington Court, Williamsville, N.Y. 14221
Filed Feb. 23, 1968, Ser. No. 707,504
Int. Cl. G01n 1/12
U.S. Cl. 73—423                    4 Claims

ABSTRACT OF THE DISCLOSURE

A waste water sampling system in which uniformly sized effluent samples are collected at the end of each period during which a predetermined volumetric flow of effluent has occurred. A flow indicating device in response to the predetermined volume flow actuates a switch to operate the sample collecting device which utilizes an arm having a sampling cup at one end and a link at the other, the arm being reciprocated by a motor near its link end. In this way, a composite of these samples accurately reflects the composition of the effluent over the collection period.

BACKGROUND OF THE INVENTION

The successful design of treatment plants for water waste disposal requires an accurate picture of the average analysis of the waste water to be treated. In any given situation, it can be expected that not only will the analysis of the waste water change from time to time but also that the volumetric flow of waste will vary. The classic method of obtaining a picture of the analysis of the waste water is to manually collect samples at the end of predetermined time periods, say every hour, over some fixed time period such as twenty-four hours. The volume of these hourly collected samples is selected such as to be proportional to the flow of waste water at the time of collection and the composite of these samples, collected over the fixed time period, may be used to give a general picture of the average analysis of the waste water flowing within the fixed time period.

The principal drawback of such a method can be illustrated by considering an aggravated hypothetical case. For example, should the waste water flow and the strength of its analysis be at a low value or a minimum during each time of sample collection, with high flow surges of strong waste occurring in the intervals between collections, the composite sample obviously will be of such analysis as erroneously reflects the true conditions with which the engineer must deal.

BRIEF SUMMARY OF THE INVENTION

The present invention is based upon the principle of collecting uniformly sized samples over a fixed time period with the samples being collected on the basis of volumetric flow. Thus, as soon as a predetermined volumetric flow of waste water, or a multiple thereof, has occurred, one of the uniformly sized samples is taken. In this fashion, the composite sample more accurately reflects the average analysis or composition of the waste water during the collection period. Moreover, the present system allows smaller samples to be taken while still preserving the integrity of the average analysis.

The invention involves the use of a flow indicating device comprising a weir or measuring flume, a float and a recording and totalizing device connected to the float for integrating the flow rate with respect to time. As soon as the recording device indicates that the predetermined volumetric flow, or a multiple thereof, has occurred, switch means is actuated to cause a fixed volume sample to be taken and deposited in a composite sample collection device.

The fixed volume sample collection device is of simple but reliable nature, employing an arm carrying the sampling cup at one end and connected to a link at its other end with the arm being pivoted near its link end. The link is connected to the crank arm of a motor, which crank arm is shorter than the link-to-pivot portion of the sampling arm and disposed in vertically staggered relation with respect thereto so that the sampling arm sweeps through an arc of somewhat less than 180° during the first complete revolution of the crank arm and returns through this arc during the second complete revolution of the crank arm. Conveniently, the collection container, motor and sampling arm assembly may be mounted upon a weir or its equivalent which forms a supporting base therefor.

The electrical control for the motor assembly may be provided within the recorder case and it is preferred that this electrical control assembly utilize solid state components to minimize arcing and current consumption and weather related problems.

BRIEF DESCRIPTION OF THE FIGURES OF THE DRAWING

FIGURE 1 is an elevational view partly in section illustrating the construction of a preferred embodiment of the present invention;

FIGURE 2 is an enlarged view, partly in section, showing the sampling cup construction;

FIGURE 3 is a plan view as indicated generally by section line 3—3 in FIGURE 1 showing details of the float; and FIGURE 4 is a circuit diagram of the control system.

DETAILED DESCRIPTION OF THE INVENTION

With reference now more particularly to FIGURE 1, reference character 10 indicates the waste water whereas the reference numeral 12 indicates a weir board, plate or flume placed across the flowing stream. As shown, the board 12 is provided with an opening 14, the lower edge 16 of which defines a weir over which the waste water flows so that the height of the waste water upstream of the weir as indicated by the reference character 18 is indicative of the instantaneous volumetric flow over the weir. An anchor member 20 is pivotally connected as through a suitable bracket 22 fixed to weir 12 to extend upstream and is provided with a bifurcated end portion 24, see particularly FIGURE 3, which pivotally mounts a float 26. One end of a cable 28 or the like is anchored to a suitable eye 30 of the float and the other end of the cable, after passing around the pulley 32 of the recording device 34 is dead-ended at 36 on the recording device frame, there being a weight 38 maintaining the cable taut throughout. For this purpose, the weight may be provided with a pulley having a spindle 40.

The weir plate 12 supports a base member 42 upon which is mounted a motor 44 driving, through a suitable gear reduction unit, an output shaft 46 to which is connected a crank arm 48. The crank arm is connected to a link assembly indicated generally by the reference character 50 which extends between the crank arm and the lower end of a sampling arm 54 whereat it is pivotally connected as at 52.

The sampling arm is pivotally connected as at 56 to the stand portion 58 mounted on the base 42 and carries, at the extremity of the portion 60 thereof beyond the pivot 56 a sampling cup indicated generally by the reference character 62. The sampling cup as is shown in FIGURE 2 may take the form of an open ended tubular cup member 64 pivotally mounted to the upper extremity of the arm portion 60 with the arm portion 60 being provided with a rigid bail 66 which, when the parts are in the position of FIGURE 2, extends beneath the cup 64 and constrains it to assume a dumping position as shown. Otherwise, the cup 64 is free to pivot on the end of the arm portion 60 so that when the arm is in the phantom line position shown in FIGURE 1, the open top of the cup 64 is disposed uppermost and below the surface of the waste water downstream of the weir plate 12. The upper portion of the stand 58 carries a trough indicated generally by the reference character 68 terminating in a downspout 70 leading into the collection bottle 72 supported on a platform 74 mounted on the stand 58, substantially as is shown.

In order to produce the desired motion of the arm 54 it can be shown that the effective length of the crank arm 48 driven by the motor must be less than half the length between the pivot points 52 and 56 of the sampling arm 54. With this relationship prevailing and with the length of the link 50 properly adjusted the sampling arm will define a total arc in one direction of somewhat less than 180° in response to the first complete rotation of the output shaft 46 and will move from one extreme position which is the full line position shown in FIGURE 1 through the opposite extreme position (not shown) to the phantom line position shown during the first revolution of the output shaft. Then, upon the second complete revolution of the output shaft 46, the arm 54 will sweep back through the same arc and return to the full line position shown in FIGURE 1 at which point the limit switch 76 is actuated by engagement of the arm 54 with the toggle lever 78 thereof.

Referring now to FIGURE 4, the circuit diagram shown therein illustrates the supply mains 80 and 82 across which the motor 44 is adapted to be connected whenever the motor control switches 84 and 86 are closed, same normally being open. These two switches 84 and 86 together with the additional switches 88 and 90 are controlled by the motor control relay 92 which is connected across the mains 80 and 82 in such fashion as normally to be deenergized. A transistorized relay 94 is provided with the normally open switch contacts 96 and the normally closed switch contacts 98 and is provided with the input lines 100 controlled, through a switch 102 by the recorder device 104. As soon as the recorder device 104 measures a predetermined volumetric flow of waste water, or a multiple thereof, the swtich 102 is closed thus energizing the transistorized relay 94 to close the switch contacts 96 and open the switch contacts 98. Opening the switch contacts 98 deenergizes the normally energized control relay 106 so that its associated switch contacts 108 and 110 are operated to closed condition. The limit switch 76, being closed by engagement of the arm 54 against its toggle 78 now completes the circuit through the motor control relay 92, thus closing the sticking switch contact 90 and the motor energizing contacts 84 and 86. The circuitry will remain energized to energize the motor 44 until the limit switch 76 is once again actuated.

The transistorized relay is used so that only a slight current on the totalizer contacts is required, obviating arcing and burning of such contacts.

The recorder 104 shown in FIGURE 4 may take any conventional form. Basically, this unit comprises a wheel driven at a rate of one revolution per twenty-four hours and upon the face of which is mounted a disc of recording paper. A stylus is driven by the member 28 through the medium of a pulley so that as the float 26 rises and falls the stylus will respond correspondingly to draw the curve on the recording paper, the area under the curve representing the total flow. An integrator device is connected to the recorder and integrates the area under the curve to operate the counter. The counter shaft may be provided wtih a cam to operate the switch 102 generating the signal to the relay 94 once every revolution of the counter shaft. An anti-repeat switch may be used to prevent repetition of the cycling sample in the event that the flow rate is not sufficiently great to allow the counter shaft cam to reopen the switch 102 before the sampling cycle is completed.

The above mechanism is shown generally in FIGURE 1 although it forms per se no part of the present invention since recorder-totalizers are conventional and readily available commercially. Preferably I use a Bailey recorder with totalizer, model FF36.

Obviously, many modifications and variations of the present invention are possible in the light of the above teachings. It is therefore to be understood that within the scope of the appended claims the invention may be practiced otherwise than as specifically described.

What is claimed is:

1. A system for obtaining a composite sample of liquid effluent for analysis purposes, comprising in combination, totalizing means for producing an output representing total flow of the effluent, a container for the composite sample, sample taking means for placing individual samples of the effluent into said container, in which said individual samples are of a predetermined fixed volume, said sample taking means comprising an arm pivotally mounted between its ends, and a sample cup carried by one end of said arm and adapted to dump an individual sample into said container, drive means for swinging said arm about its pivot to move said cup arcuately from a dumping position to a sample-receiving position and back to dumping position, and means for actuating said drive means in response to output of said totalizing means representing a predetermined fixed volume of total flow and integer multiples thereof, said drive means being connected to the other end of said arm for oscillating said arm through a predetermined arcuate range, said drive means comprising a motor having a drive shaft, a crank fixed to said drive shaft, a link pivotally connected to said crank and extending therefrom into pivotal connection with said arm, the length of said crank between the center of said shaft and the pivotal connection thereto of said link being less than one-half the length between the point of pivotal connection of said arm and the pivotal connection between said link and said arm, and the length of said link being greater than the length of said crank, whereby said shaft rotates one complete revolution to sweep said cup from its dumping position to its receiving position and a second complete revolution to return said cup to dumping position.

2. The system as defined in claim 1 wherein said means for actuating includes control means for operating said motor in response to each output of said totalizing means.

3. The system as defined in claim 2 wherein said control means includes a first relay receiving the outputs from said totalizing means and a second relay operative in response to actuation of the first relay to energize said motor.

4. The system as defined in claim 3 wherein said control means also includes a limit switch actuated by said arm when said sample cup is returned to dumping position to terminate the sample taking cycle.

References Cited

UNITED STATES PATENTS

| | | | |
|---|---|---|---|
| 1,235,090 | 7/1917 | Williams | 73—423 |
| 1,843,552 | 2/1932 | Gibson et al. | |
| 2,270,511 | 1/1942 | Crain. | |
| 2,327,123 | 8/1943 | Morse. | |
| 2,348,806 | 5/1944 | Gillard et al. | 73—424 X |
| 3,267,737 | 8/1966 | Biebighauser | 73—423 |

S. CLEMENT SWISHER, Primary Examiner

D. M. YASICH, Assistant Examiner